Patented Nov. 25, 1924.

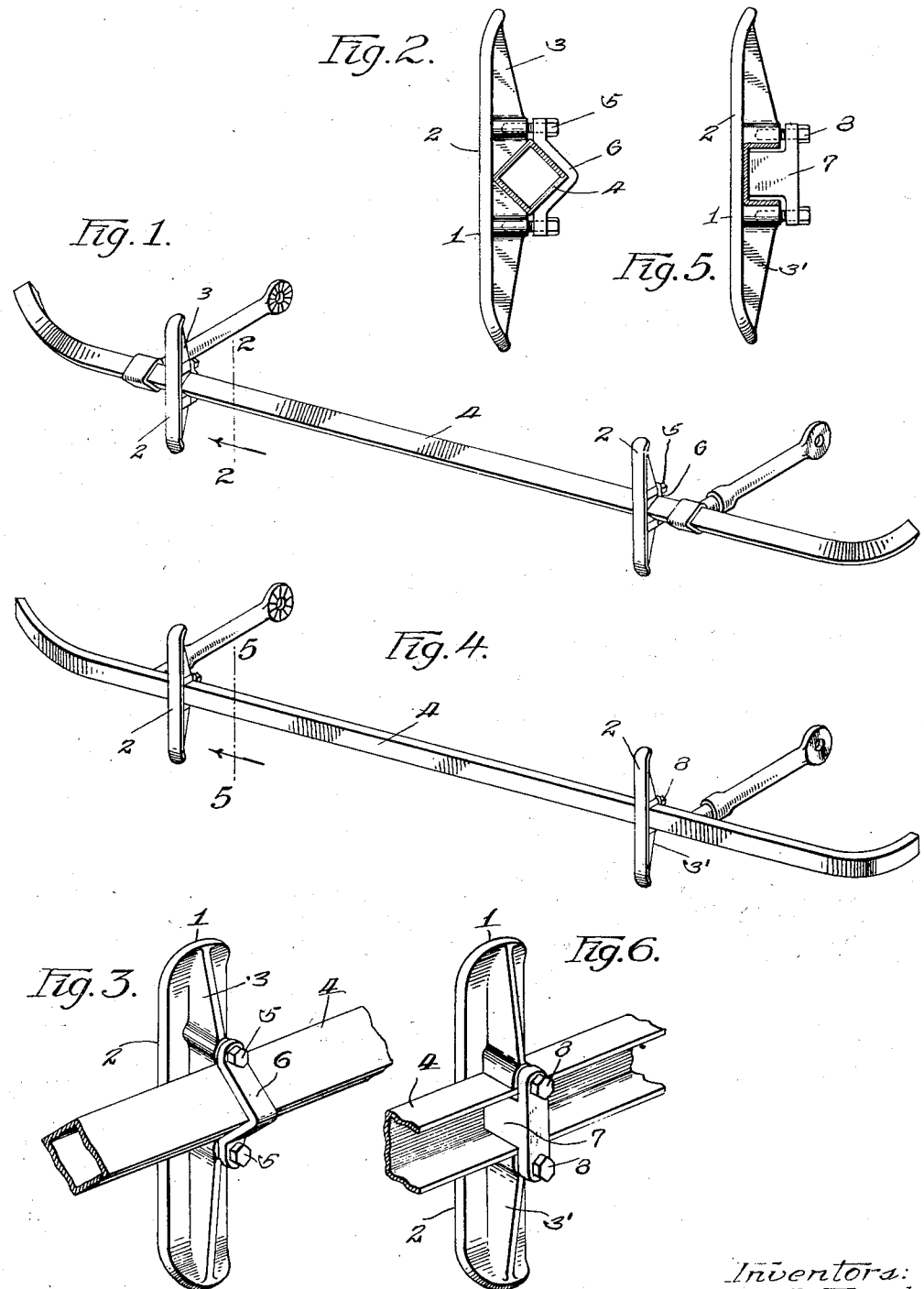

1,516,961

UNITED STATES PATENT OFFICE.

HARRY L. FRENCH AND WILLIAM A. STARCK, OF MILWAUKEE, WISCONSIN, ASSIGNORS TO BADGER MFG. CORPORATION, OF MILWAUKEE, WISCONSIN, A CORPORATION OF DELAWARE.

BUMPER ATTACHMENT.

Application filed January 15, 1921. Serial No. 437,472.

*To all whom it may concern:*

Be it known that we, HARRY L. FRENCH and WILLIAM A. STARCK, citizens of the United States, residing respectively at Milwaukee, in the county of Milwaukee and State of Wisconsin, have invented new and useful Improvements in Bumper Attachments, of which the following is a specification.

This invention relates to a bumper attachment.

It relates particularly to a means to increase the effective buffing area of an automobile bumper to prevent the passing of the bumper of one car above or below the bumper of another if the two cars should collide.

An object of the invention is to provide an improved attachment for a vehicle bumper which is strong, durable and which may be economically manufactured.

Another object is to provide an improved attachment for a vehicle bumper which may be readily secured to an impact bar thereof.

The views of the drawings are as follows:

Fig. 1 is a perspective showing two of the attachments secured to a diamond shaped impact bar, Fig. 2 is a section on line 2—2 of Fig. 1, Fig. 3 is a rear perspective, Fig. 4 is a perspective showing two of the attachments in place on a channel-shaped impact bar, Fig. 5 is a section on line 5—5 of Fig. 4, and Fig. 6 is a rear perspective.

In accordance with the invention, a bumper attachment 1 is cast or otherwise formed from suitable material to comprise a shoe 2 and a reinforcing web 3.

The reinforcing web 3 is cut away to receive a diamond-shaped impact bar 4, as shown in Figs. 1, 2 and 3.

The reinforcing web 3 is bored and tapped to receive bolts 5 which pass through the ends of a strap 6 to clamp and hold the attachment securely in position on the impact bar, The clamp 6, as shown in Fig. 2, is shaped to fit the impact bar.

The modification shown in Figs. 4, 5 and 6 shows an attachment 1 having the reinforcing web 3' thereof shaped to receive a channel-shaped impact bar.

A member 7 is shaped to enter the channel of the impact bar and to receive bolts 8 to secure and hold the attachment firmly in position on the bar.

The attachment 1 may be arranged on the impact bars 4 in the manner shown in Figs. 1 and 4.

A bumper is thereby provided with an attachment extending above and below the same to increase the effective buffing area thereof in the vertical plane.

When two cars having bumpers disposed in different horizontal planes collide, the bumper of one will engage the shoes 2 of the bumper attachments of the other car and prevent damage to either or possible interlocking of the bars.

Various changes of structure may be made without departing from the spirit of the invention or the scope of the claims.

The invention claimed is:

1. An attachment for a vehicle bumper comprising a shoe and a reinforcing web therefor, said web being shaped to receive the impact bar of the bumper.

2. An attachment for a vehicle bumper comprising a shoe and a reinforcing web therefor, said web being shaped to receive the impact bar of the bumper and to receive means to secure said attachment to said bar.

3. An attachment for a vehicle bumper comprising a shoe having a reinforcing web shaped to receive the impact bar of the bumper, a member formed to fit said bar, and means to clamp said bar between said shoe and said member.

In witness whereof, we have hereunto subscribed our names.

HARRY L. FRENCH.
WM. A. STARCK.